US012323782B2

(12) United States Patent
Khromov et al.

(10) Patent No.: US 12,323,782 B2
(45) Date of Patent: Jun. 3, 2025

(54) ELECTRODYNAMIC LOUDSPEAKER WITH EASILY DETACHABLE MOVING PART MODULE

(71) Applicant: Andrei Vladimirovich Khromov, Tolyatti (RU)

(72) Inventors: Andrei Vladimirovich Khromov, Tolyatti (RU); Eduard Rafaelevich Safin, Kazan (RU); Liliia Sergeevna Safina, Kazan (RU)

( * ) Notice: Subject to any disclaimer, the term of this patent is extended or adjusted under 35 U.S.C. 154(b) by 28 days.

(21) Appl. No.: 18/032,237

(22) PCT Filed: May 23, 2022

(86) PCT No.: PCT/RU2022/050163
§ 371 (c)(1),
(2) Date: Apr. 17, 2023

(87) PCT Pub. No.: WO2022/250579
PCT Pub. Date: Dec. 1, 2022

(65) Prior Publication Data

US 2023/0396929 A1 Dec. 7, 2023

(30) Foreign Application Priority Data

May 24, 2021 (RU) ................................ 2021114651

(51) Int. Cl.
*H04R 9/06* (2006.01)

(52) U.S. Cl.
CPC ...................................... *H04R 9/06* (2013.01)

(58) Field of Classification Search
CPC ........ H04R 9/06; H04R 31/006; H04R 9/025; H04R 9/04
See application file for complete search history.

(56) References Cited

U.S. PATENT DOCUMENTS 7,305,750 B2 * 12/2007 Proni .................. H04R 31/006 381/174
2018/0288530 A1 * 10/2018 Chen ........................ H04R 9/02

* cited by examiner

*Primary Examiner* — Tuan D Nguyen
(74) *Attorney, Agent, or Firm* — Nadya Reingand

(57) ABSTRACT

An electrodynamic loudspeaker is provided, which comprises detachable and supporting frames. A magnetic system comprising a permanent magnet and bottom and top magnetic conductors is attached to the supporting frame. A suspension and a centering washer are attached to the detachable frame, and fastened to a cone, a dust cap, and a voice coil. The coil has a winding arranged in a magnetic gap and interacting with a magnetic field of the magnetic system, and an upper part connected to the cone and the washer. The coil is connected via flexible conductors to terminals arranged on the detachable frame. The detachable frame is removably attached to the supporting frame and/or to the magnetic system and is aligned relative to the magnetic system. The loudspeaker can be easily and quickly repaired, its sound characteristics can be quickly changed, and its moving part can be accurately aligned relative to the magnetic system.

2 Claims, 3 Drawing Sheets

ELECTRODYNAMIC LOUDSPEAKER WITH EASILY DETACHABLE MOVING PART MODULE

FIELD OF THE INVENTION

The invention relates to electroacoustics and, in particular, to electrodynamic loudspeakers (speakers) having an easily detachable moving part module that provides a high degree of accuracy in the alignment of components.

BACKGROUND OF THE INVENTION

Speakers are widely used in various sound and acoustic systems, and their main disadvantage is their poor maintainability, namely: the complexity of assembling and disassembling device parts, and the necessity of using only rare, specialized service centers. Therefore, their repair is quite lengthy, expensive and, not always, impractical. Furthermore, since their design is not dismountable, it is also practically impossible to replace parts of the speakers with parts having other acoustic and electromechanical characteristics.

Given the above, it is required to create an electrodynamic loudspeaker having greater maintainability and the ability to easily change its acoustic and electromechanical characteristics, while providing the accurate alignment of a moving part relative to a magnetic-system gap. The accurate alignment is extremely important since the magnetic gap must be as narrow as possible to achieve the high performance of the electrodynamic loudspeaker. In the narrow gap, an inaccurately aligned voice coil can touch magnetic conductors during operation, which will make the correct operation of the loudspeaker impossible.

WO 2019003646 A1 discloses an electrodynamic loudspeaker on a carrier frame. The electrodynamic loudspeaker comprises a lower magnetic conductor having a core, a permanent magnet and an upper magnetic conductor, which constitute a magnetic system and serve to create and concentrate a permanent magnetic field in a magnetic gap. At the same time, a voice coil has a winding arranged in the magnetic gap and an upper part attached to a diffuser.

The disadvantage of the known electrodynamic loudspeaker is that the upper frame is not detachable, which leads to the complexity of the loudspeaker repair, maintenance, the inability to quickly change the sound characteristics of the loudspeaker, as well as the inability to align the frame with the parts of a movable sound system relative to the main frame.

SUMMARY OF THE INVENTION

The technical result of the invention consists in simplifying and reducing the time for device repair, providing the ability to quickly change device sound characteristics, and providing the accurate and quick alignment of a moving part relative to a magnetic system.

The technical result is achieved by that an electrodynamic loudspeaker comprises a detachable frame and a supporting frame. A magnetic system is attached to the supporting frame and comprises a bottom magnetic conductor having a core, a permanent magnet, and a top magnetic conductor. A suspension and a centering washer are attached to the detachable frame. The suspension and the centering washer are fastened to a cone, a dust cap, and a voice coil. The voice coil has a winding arranged in a magnetic gap and interacting with a magnetic field of the magnetic system, and an upper part rigidly connected to the cone and the centering washer. The voice coil is connected via flexible conductors to terminals arranged on the detachable frame to conduct an electrical signal to the voice coil. The detachable frame, together with the cone, the suspension, the centering washer, the voice coil, the dust cap, the flexible conductors and the terminals, constitutes a detachable module and is attached to the supporting frame and/or to the magnetic system by using detachable couplings, and is configured to be aligned relative to the magnetic system by engaging a centering surface of the detachable frame with a centering surface of the magnetic system.

In an embodiment, the magnetic system of the electrodynamic loudspeaker comprises the bottom magnetic conductor configured as a hollow cylinder having a bottom, a magnet arranged on the bottom inside the cavity of the bottom magnetic conductor and the top magnetic conductor arranged on the magnet. In this embodiment, the detachable frame is aligned relative to the bottom magnetic conductor.

BRIEF DESCRIPTION OF THE DRAWINGS

The invention is further explained with reference to the drawings, in which.

DETAILED DESCRIPTION OF THE INVENTION

Figure 1:
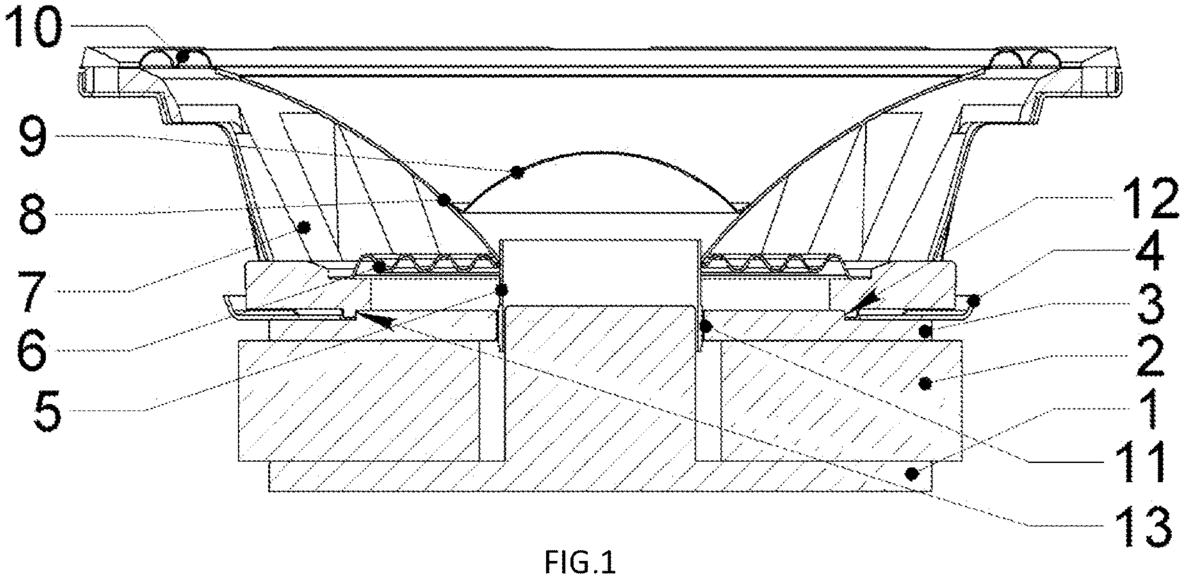
FIG. 1 shows an electrodynamic loudspeaker assembled with a magnetic system arranged under a supporting frame.
Figure 2:
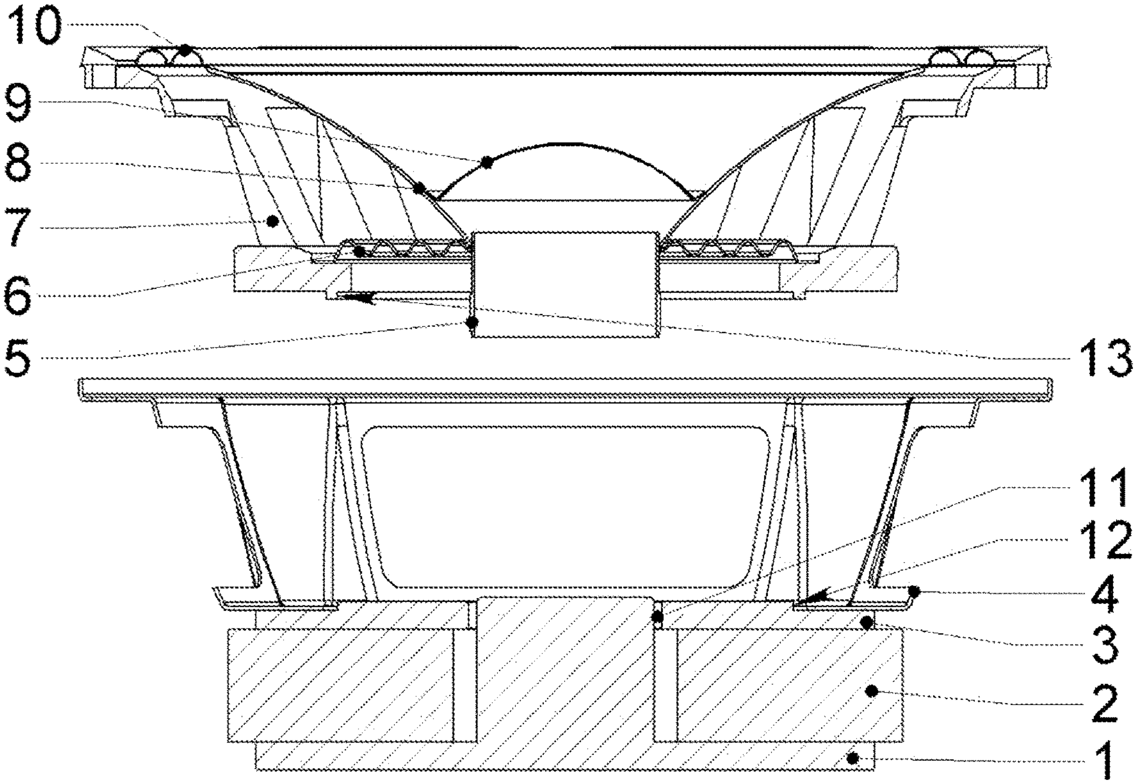
FIG. 2 shows an electrodynamic loudspeaker assembled with a magnetic system arranged under a supporting frame, wherein a detachable frame having a moving part is detached from the supporting frame and the magnetic system.
Figure 3:
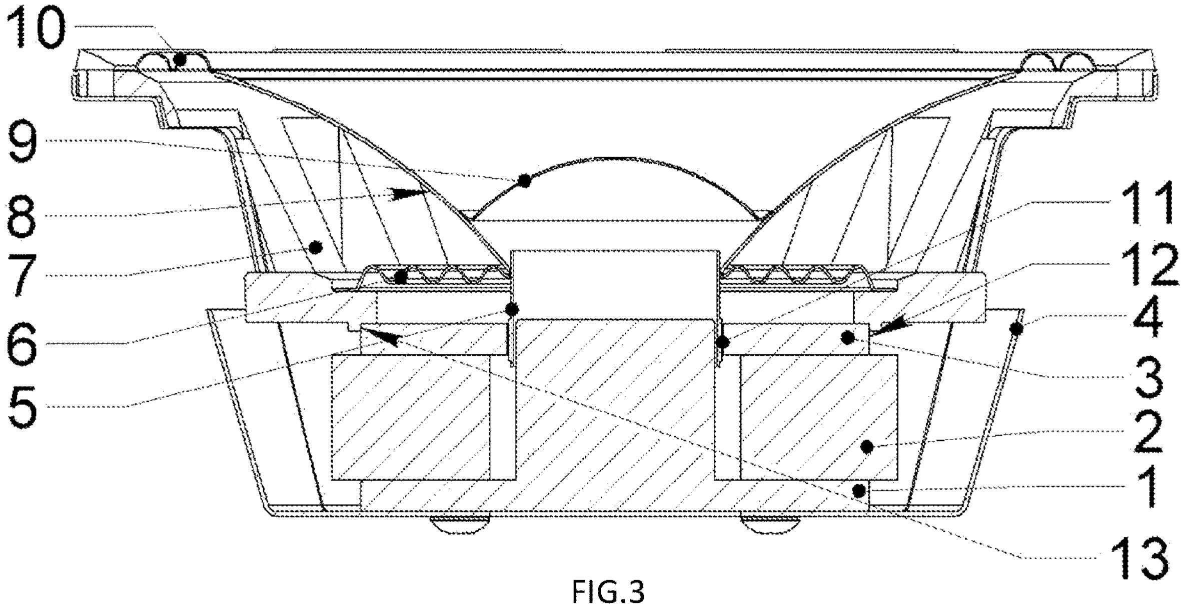
FIG. 3 shows an electrodynamic loudspeaker assembled with a magnetic system arranged inside a supporting frame.
Figure 4:
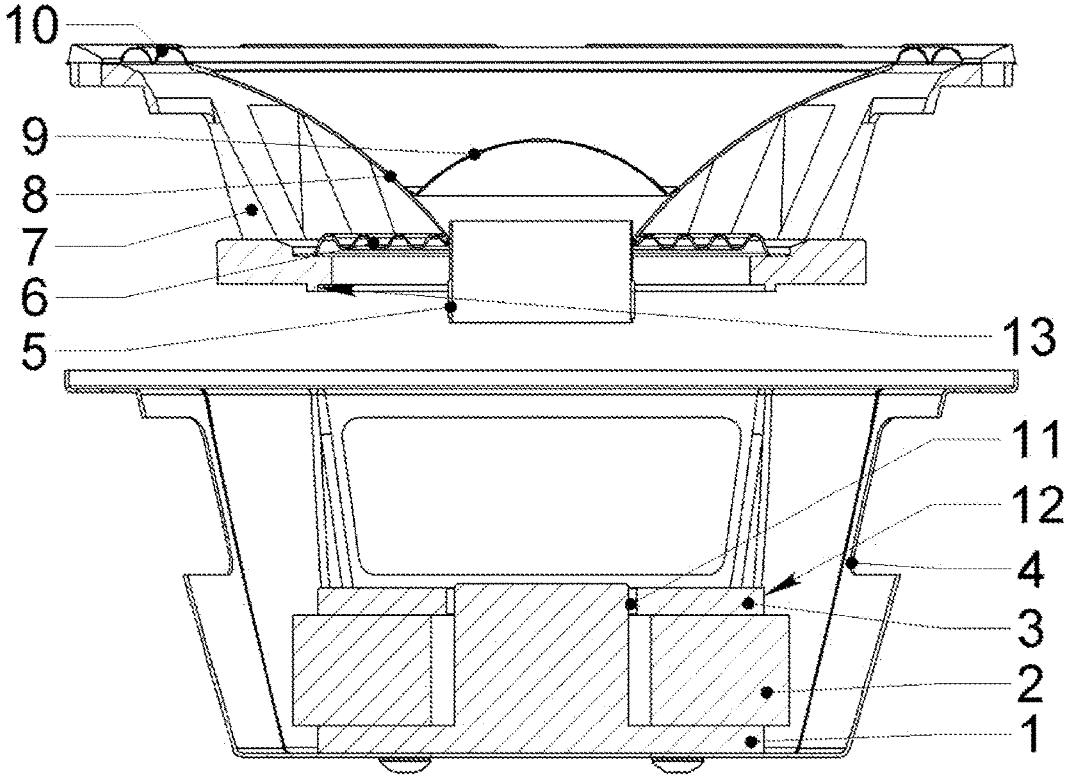
FIG. 4 shows an electrodynamic loudspeaker assembled with a magnetic system arranged inside a supporting frame, wherein a detachable frame having a moving part is detached from the supporting frame and the magnetic system.
Figure 5:
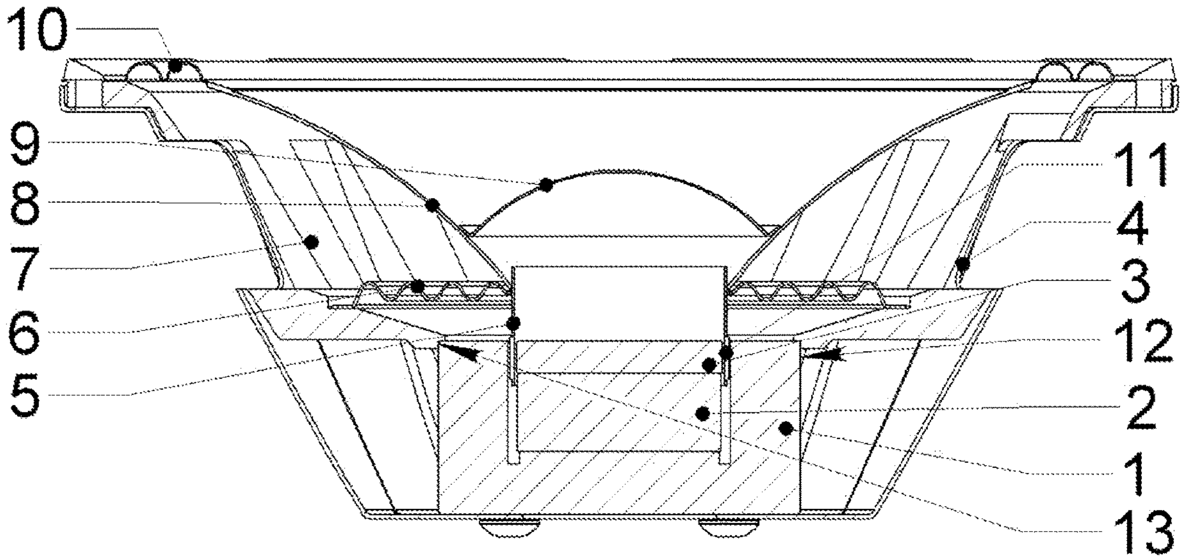
FIG. 5 shows an electrodynamic loudspeaker having a magnetic system that comprises a bottom magnetic conductor configured as a hollow cylinder having a bottom, a magnet arranged on the bottom inside the cavity of the bottom magnetic conductor and a top magnetic conductor arranged on the magnet.
Figure 6:
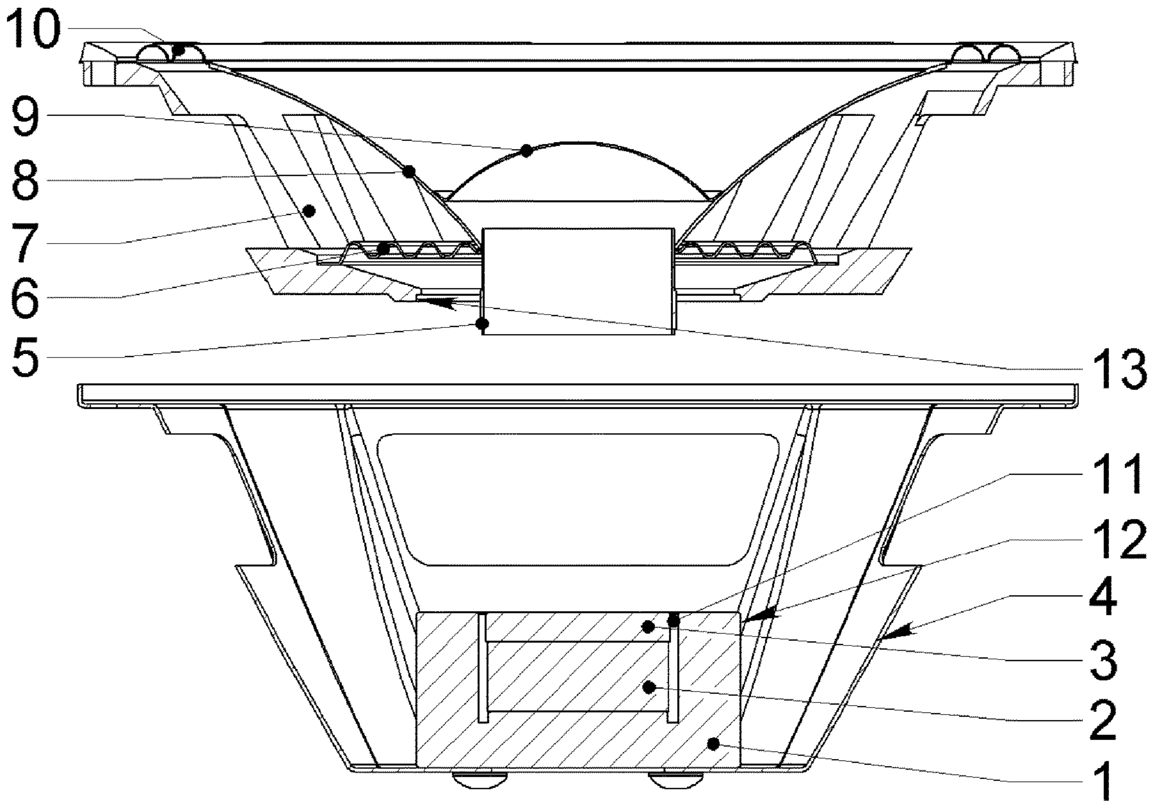
FIG. 6 shows an electrodynamic loudspeaker having a magnetic system that comprises a bottom magnetic conductor configured as a hollow cylinder having a bottom, a magnet arranged on the bottom inside the cavity of the bottom magnetic conductor and a top magnetic conductor arranged on the magnet, wherein a detachable frame having a moving part is detached from the supporting frame and the magnetic system.

An electrodynamic loudspeaker comprises a detachable frame 7 and supporting frame 4. The detachable frame 7 carries all parts of a movable system through a centering washer 6 and a suspension 10, as well as terminals and flexible conductors, and is a detachable module. This frame 7 is detached together with a voice coil 5, the centering washer 6, a cone 8, a dust cap 9, the suspension 10, the terminals and the flexible conductors when repairing or changing the characteristics of the loudspeaker. If it is necessary to quickly repair or change the acoustic or electromechanical characteristics, the detachable frame 7, together with all parts of the movable system, is replaced with another one within the shortest time possible.

The supporting frame 4 holds the entire assembly on itself, including the detachable frame 7 with the entire movable system. The supporting frame 4 is connected to a magnetic system comprising a bottom magnetic conductor 1 having a core, a permanent magnet 2 and a top magnetic conductor 3 either inside itself, or the magnetic system is attached under the base of the supporting frame 4. In this case, the bottom magnetic conductor 1 with the core and the top magnetic conductor 3 serve to concentrate the magnetic field of the permanent magnet 2 in a magnetic gap 11. The top magnetic conductor 3 has a centering surface 12 engaged with a centering surface 13 of the detachable frame 7, thereby aligning the detachable frame 7 relative to the magnetic system and, consequently, the voice coil 5 relative to the magnetic gap 11. The supporting frame carries the entire structure, the heavy magnetic system, and therefore must be cast or stamped from thick steel.

The voice coil 5 serves to create a force that drives the cone 8. The winding of the voice coil 5 is arranged in the magnetic gap 11, while the voice coil 5 and the cone 8 are connected to the detachable frame 7 by means of the flexible centering washer 6 and the suspension 10.

When an electric current flows through the winding of the voice coil 5 which is arranged in the magnetic gap 11 with a constant magnetic field, forces driving the voice coil 5 are formed therein. Since the voice coil 5 is rigidly connected to the cone 8 and they are both attached through the flexible centering washer 6 and the suspension 10 to the detachable frame 7, the voice coil and the cone can reciprocate along the axis of the coil, since it is this and only such movement which allows for the shape of the centering washer 6 and the suspension 10. In this case, the force arising in the voice coil is also directed along the axis of the coil, and it causes the voice coil 5 connected to the cone 8 to move. When moving, the cone 8 creates sound waves.

The centering washer 6 serves to align the moving system (the cone 8, the dust cap 9, the voice coil 5) relative to the magnetic gap 11.

In this case, the suspension 10 also serves to seal the inner side of the cone 8 from the outer side of the cone 8, and aligns, together with the centering washer 6, the movable system in the magnetic gap 11.

The cone 8 is driven by the voice coil 5 and serves to create sound waves.

The magnetic gap 11 is a location in the magnetic system where the magnetic system concentrates the maximum magnetic field. The winding of the voice coil 5 is arranged in the magnetic gap, while the voice coil 5 does not touch the parts of the magnetic system.

The dust cap 9 serves to protect the magnetic gap 11 from foreign objects. It is connected to the cone 8 and moves with it, also emitting sound waves.

In this case, the detachable frame 7 is the top one and is attached to the supporting frame 4 and/or the magnetic system with easily detachable couplings, such as screws, latches or other quick-release clamps. The detachable frame 7 is aligned relative to the magnetic system through the engagement of the centering surface 13 of the detachable frame 7 with the centering surface 12 of the magnetic system. The centering surface can be made in the form of a protrusion on the supporting frame 7 and a protrusion on the magnetic system 12. These protrusions are made mainly annular; however, the protrusion can be made in the form of sectors, for example, consist of three or more sections equally spaced from each other. Also, the centering surfaces can be cylindrical or conical.

The alignment of the detachable frame 7, and, consequently, the entire movable system relative to the magnetic system allows one to align the voice coil 5 relative to the magnetic gap 11 more accurately, since the magnetic gap is arranged in the magnetic system.

The movable system module based on the detachable frame allows one to quickly repair the loudspeaker in case of breakdowns of parts of the movable system, since the parts of the movable system, as a rule, fail. At the same time, the loudspeaker without the detachable movable system can only be repaired by people with special skills and special equipment and adhesives. And the proposed detachable frame with the movable system for replacement requires only an accessible tool, such as a screwdriver, etc., and does not require special skills. Furthermore, by using the detachable top frame, a person can change the moving system module to another one with different acoustic and electromechanical characteristics, for example, to make a midrange speaker with a light moving system into a woofer with an increased linear stroke and low resonance, or make a very loud speaker with a large frequency response unevenness into a moderately loud speaker with a smoother tonal balance and a more balanced sound.

Thus, the detachable frame with the parts of the movable system is detached easily and quickly from the supporting frame, which simplifies and speeds up repairs, provides the ability to quickly change the acoustic and electromechanical characteristics of the device. At the same time, the alignment of the detachable frame relative to the magnetic system ensures that the movable part of the detachable frame is centered immediately relative to the magnetic system, which makes the alignment more accurate and the magnetic gap narrower. Furthermore, the detachable frame can be made of plastic or thin metal, which makes it inexpensive and affordable for replacement. The supporting frame must carry the heavy magnetic system and it is usually made of thick metal by stamping or casting, which significantly increases its cost. In case of repair or replacement, in addition to the moving system, one only needs to change the detachable frame, the price of which is not so high, and does not need to change the expensive supporting frame.

The invention claimed is:

1. An electrodynamic loudspeaker comprising:

a detachable frame;

a supporting frame;

a magnetic system attached to the supporting frame and comprising a bottom magnetic conductor having a core, a permanent magnet, and a top magnetic conductor;

a suspension and a centering washer which are attached to the detachable frame, the suspension and the centering washer being fastened to a cone, a dust cap, and a voice coil, the voice coil having a winding arranged in a magnetic gap and interacting with a magnetic field of the magnetic system, the voice coil having an upper part rigidly connected to the cone and the centering washer, the voice coil being connected via flexible conductors to terminals arranged on the detachable frame to conduct an electrical signal to the voice coil;

wherein the detachable frame, together with the cone, the suspension, the centering washer, the voice coil, the dust cap, the flexible conductors and the terminals, constitutes a detachable module and is attached to the supporting frame and/or to the magnetic system by using detachable couplings, and is configured to be aligned relative to the magnetic system by engaging a centering surface of the detachable frame with a centering surface of the magnetic system.

2. The electrodynamic loudspeaker of claim 1, wherein the magnetic system comprises the bottom magnetic conductor configured as a hollow cylinder having a bottom, a magnet arranged on the bottom inside a cavity of the bottom magnetic conductor and the top magnetic conductor arranged on the magnet, and wherein the detachable frame is aligned relative to the bottom magnetic conductor.

* * * * *